March 22, 1960

H. ENGLEMAN 2,929,988

Q-METER CIRCUIT

Filed Nov. 8, 1956

INVENTOR
H. ENGLEMAN

BY *Walter M. Hill*

ATTORNEY

United States Patent Office 2,929,988
Patented Mar. 22, 1960

2,929,988

Q-METER CIRCUIT

Henry Engleman, Winston-Salem, N.C., assignor to Bell Telephone Laboratories, Incorporated, New York, N.Y., a corporation of New York Application November 8, 1956, Serial No. 621,128

6 Claims. (Cl. 324—57)

This invention relates to the art of electrical measuring and in particular to an apparatus for measuring and comparing the Q and resonant frequency characteristics of a circuit element against a standard.

In the production of high accuracy circuit elements, such as inductance coils and capacitors, it is necessary to determine the Q or quality factor of each element in order to insure its satisfactory performance in electronic equipment. This symbol Q designates the ratio of the reactance to the resistance of the circuit element. For an inductance $Q=\omega L/R$ while for a capacitance $Q=1/\omega CR$.

A meter has previously been devised for measuring the quality factor (Q) of a circuit element and it consists essentially of a tuning element for resonating the element to be measured, an oscillator for injecting a fixed voltage of desired frequency into the resonant circuit, and a meter for measuring the voltage drop across the tuning element, the meter being calibrated in values of Q to provide a direct reading thereof. A more detailed explanation of Q and of the basic Q-meter circuit may be had by reference to the patent to H. A. Snow, No. 2,137,787, November 22, 1938, and "Basic Electrical Measurements" by M. B. Stout, Prentice-Hall, Inc. (1950).

In the production of circuit elements such as inductances, a standard inductance is frequently connected to a conventional Q-meter at specified time intervals. The Q readings thus obtained serve as operating values for determining limits on the inductances being produced. Unfortunately, however, this procedure frequently results in the production of out-of-limit inductances, as demonstrated by subsequent faulty operation of the inductances in the units for which they were intended. These failures are attributable to small shifts in the Q-meter line voltage, frequency shifts in the variable frequency oscillator, small changes in room temperature and other similar variables which occur between the time the meter is checked with the standard inductance and the time the unknown inductances are tested.

The resonant frequency characteristics of the unknown coils can also be analyzed by initially coupling a standard coil to the conventional Q-meter test terminals, adjusting the resonating capacitor to give a maximum meter reading and then noting the capacitor dial setting. By repeating this operation with an unknown inductance, the resonant frequency characteristics of the unknown coil can be compared with that of the standard previously measured. Due to the above noted variables, however, this procedure may likewise result in the production of inductances of improper characteristics.

It is the object of this invention, therefore, to simultaneously and directly measure and compare the Q and resonant frequency characteristics of a circuit element against a standard.

The foregoing object is attained in accordance with this invention by connecting a standard circuit element in parallel with the element whose electrical characteristics are to be determined. A separate adjustable tuning means is inserted in series with each circuit element and the tuning means are ganged to closely track each other throughout their tuning range. By coupling a voltage source of adjustable frequency to these parallel connected series circuits and simultaneously indicating the amplitude of the voltage drop across each tuning means, the electrical characteristics of the paralleled circuit elements can be measured and compared.

This invention will be better understood from the following description when considered in connection with the accompanying drawing wherein.

Figure 1:
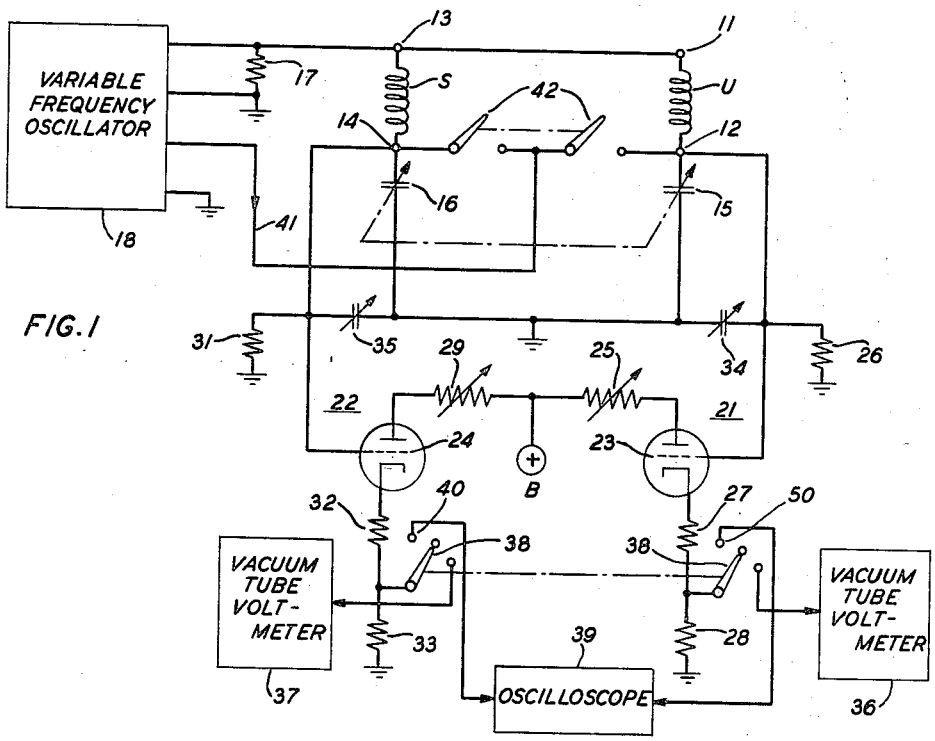
Fig. 1 is a schematic diagram illustrative of the present invention.

For the purpose of illustrating this invention, it is assumed that a circuit element of the inductive type is to be measured, although other reactive impedance elements can be similarly measured. The inductance whose characteristics are known is designated by reference character U in Fig. 1. This element is connected to the test terminals 11 and 12 and the standard inductance S of known characteristics is connected in parallel therewith to test terminals 13 and 14. The test terminals for the inductance coils are sufficiently separated to provide negligible coupling between the two coils. Separate, adjustable, tuning capacitors 15 and 16 are connected respectively in series with the unknown and standard inductance coils, with capacitor 15 connected between terminal 12 and ground and capacitor 16 connected between terminal 14 and ground. These series resonating capacitors are ganged to track each other within plus-or-minus 0.5 micromicrofarad throughout their tuning range.

Resistance 17 is a series element in each of the series resonant circuits. This resistance should be non-reactive, preferably only a few hundredths of an ohm large, and may, if desired, be of the type and construction disclosed in the above noted Snow patent. Connected across this resistance is an output voltage from the variable frequency oscillator 18, the oscillator being tunable over any desired range and of variable voltage output. The voltage across resistance 17 establishes a current flow in each series resonant circuit, which, all things being equal, should be the same for each circuit.

The voltage drop across capacitor 15 is applied to the grid 23 of cathode follower circuit 21 and the voltage drop across capacitor 16 is applied to the grid 24 of the cathode follower 22. Cathode follower circuit 21 is provided with a variable plate load resistor 25, grid resistor 26, and a pair of unbypassed cathode resistors 27 and 28. Likewise, the cathode follower circuit 22 possesses a variable plate load resistor 29, a grid resistor 31, and a pair of unbypassed cathode resistors 32 and 33. For purposes of circuit balance, those resistances, in both cathode followers, which are the circuit equivalents should be of the same size. The variable plate load resistors 25 and 29 are used to achieve an initial balance between the respective cathode currents. Trimming capacitors 34 and 35 are connected respectively between the grids 23 and 24 and ground and serve to balance the input capacitance of the cathode followers to within 0.1 micromicrofarad of each other under dynamic conditions.

The vacuum tube voltmeter 36 is connected to the junction of cathode resistors 27 and 28 by means of the double-pole, double-throw switch 38, which switch also couples the vacuum tube voltmeter 37 to the junction of cathode resistors 32 and 33. Switch 38 serves alternatively to couple the oscilloscope circuit 39 to the aforementioned cathode resistor junctions. Thus, in one switch position the voltmeters 36 and 37 will be utilized for measuring purposes while in the other switch position the oscilloscope circuit will be so utilized. While the cathode follower circuits have been illustrated as being separate and distinct from the vacuum tube voltmeters, it should be understood that these circuits could in fact comprise the input circuits of the vacuum tube voltmeters.

A separate circuit, comprising conductor 41 and double-pole switch 42, is used to insure an initial balanced condition prior to the testing of the inductance coils. A signal voltage of the desired frequency is applied to conductor 41, the series resonant circuits are disabled by the removal of the inductance coils, and the switch 42 is thrown to apply the signal voltage to the terminals 12 and 14. By the use of the variable plate load resistors 25 and 29, and the trimming capacitors 34 and 35, the respective circuits are balanced in a conventional manner.

The operation of the instant device is based on the fact that the ratio of the voltage across the tuning capacitor, in each series resonant circuit, to the applied voltage is equal to the Q of the series coil (assuming of course that the series resistance 17 is of a negligibly low value). Hence, by applying a fixed voltage to each series resonant circuit, through resistance 17, the measuring circuit across each capacitor can be calibrated to read Q directly.

With the measuring circuits balanced, the switch 42 opened, the inductance coils mounted in position, and assuming the vacuum tube voltmeters connected into the circuit, a fixed voltage of selected frequency is applied to series resistance 17. The ganged capacitors are then tuned for resonance (as indicated by the largest deflection on the meter associated with standard coil). The voltmeter associated with the unknown coil is simultaneously observed, and if this coil possesses the same resonant frequency characteristics as the standard, its meter will likewise peak at the same capacitor setting. Failure to do so of course indicates that the coil should be discarded or adjusted to the correct inductance.

It should be clear to those skilled in the art that the tuning capacitor associated with the unknown coil can be calibrated, with limits designated thereon. Failure of an inductance coil to resonate within the predetermined limits would result in its being rejected. Alternatively, the coil may be adjusted and retested. This procedure would be carried out until the coil resonates at the same frequency as the the standard. In this last regard, the present device provides an indication of both the magnitude and direction of the inductance error. For example, if the unknown coil resonates at a lower capacitor setting than the standard, the coil inductance is known to be too large and should be reduced. The difference between the respective capacitor settings, at resonance, provides an indication of the magnitude of the inductance error.

When the unknown inductance is found, or adjusted, to possess the same resonant frequency characteristics as the standard, the present device will provide a simultaneous indication of the Q values of each coil, thus accurately comparing the Q of the test coil with that of the standard. The voltmeters are, as indicated previously, calibrated in values of Q and limits may be set thereon; coils failing to provide a peak reading within the designated limits would be rejected. Of course, the respective Q's may be checked at the very beginning merely by bringing each coil to resonance and noting and comparing the peak readings on each voltmeter.

The above recited procedure is only by way of example and it should be clear at this point that this measuring apparatus might be used in one of several other manners to check the characteristics of a circuit element. For example, when a very rapid testing of coils of the same kind is necessary, limits can be set on the unknown inductance meter, the standard coil brought to resonance, and then all test coils failing to register a reading within the designated limits, either because of poor Q or resonance frequency characteristics, are rejected and returned for adjustment.

The measuring and comparison procedure outlined above may also be satisfactorily carried out through the use of oscilloscope circuit 39. This method offers the added advantage of more accurately locating the exact resonating capacity of an inductance of relatively low Q by virtue of the increased amplification of the change in representative voltage during a small change in resonating capacity. This circuit, diagrammatically illustrated in Fig. 2, employs a cathode ray tube 49 for visually indicating on the screen thereof a pair of vertical lines whose respective heights are proportional to the voltages across the tuning capacitors. With the double-pole, double-throw switch 38 thrown to the left-hand position, in contact with terminals 40 and 50, the voltage across capacitor 16, representative of the standard coil S, is applied to commutator segment 51 and the voltage across capacitor 15, representative of the unknown coil U, is applied to commutator segment 52. Commutator arm 53 contacts segments 51 and 52 and is further connected to vertical amplifier 60, thence to the upper vertical deflection plate of cathode ray tube 49. Commutator arm 53 is mounted upon shaft 54, along with commutator arm 55, and the shaft is rotated by motor 56. Arm 55 contacts commutator segments 57 and 58 and is connected to a horizontal deflection plate of tube 49, the other horizontal deflection plate, along with the lower vertical deflection plate, being grounded. The segments 57 and 58 are connected to a pair of variable taps on biasing means 59.

Figure 2:
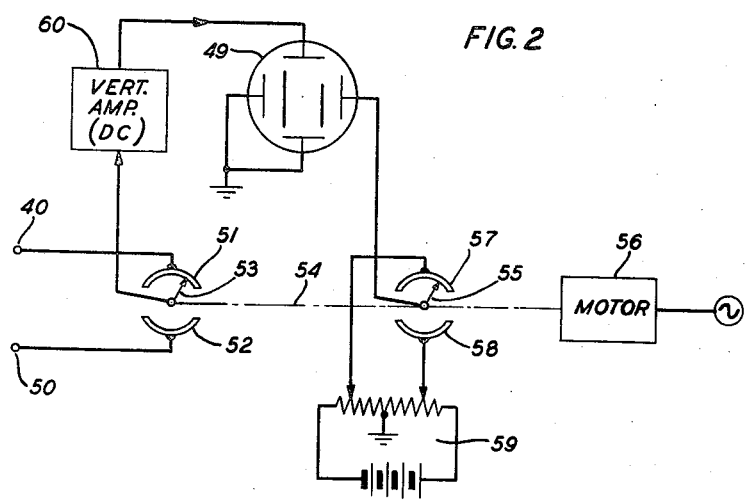
Fig. 2 is a schematic view showing one manner in which a pair of representative voltages may be simultaneously displayed on a cathode ray screen.

Thus with the commutator arms in the position shown in Fig. 2, the voltage across tuning capacitor 16 is applied to he upper vertical deflection plate, while a negative biasing potential is applied to the horizontal deflection plate, thus producing one of the vertical traces. The trace will be of a vertical height proportional to the applied voltage. With the commutator arm 53 in contact with segment 52 and arm 55 in contact with segment 58, the voltage across tuning capacitor 15 will be applied to the upper vertical deflection plate and a positive biasing potential will be applied to the horizontal deflection plate, thus producing the other trace. The two vertical traces will be horizontally disposed in accordance with the positioning of the two variable taps on biasing means 59. The screen of the cathode ray tube can be provided with a mask calibrated in values of Q.

It should be understood, of course, that the foregoing disclosure relates to only a preferred embodiment of the invention and that numerous modifications or alterations may be made therein without departing from the spirit and scope of the invention.

What is claimed is:

1. An apparatus for determining the electrical characteristics of a circuit element relative to a standard comprising a voltage source of adjustable frequency, means coupling a selected voltage of predetermined frequency from said source in parallel to said circuit element and said standard, a pair of adjustable tuning means connected respectively in series with said circuit element and said standard for resonating therewith, said tuning means being ganged to closely track each other throughout their tuning range, and means for simultaneously and separately displaying the amplitude of the voltage drop across each of said tuning means.

2. An apparatus for determining the electrical characteristics of an unknown inductance relative to a standard inductance comprising a voltage source of adjustable frequency, means for coupling a signal of predetermined voltage and frequency from said source in parallel to said unknown inductance and said standard, a pair of adjustable tuning capacitors connected respectively in series with said unknown inductance and said standard, said tuning capacitors being ganged to closely track each other throughout their tuning range, and means for simultaneously and separately observing the amplitude of the voltage drop across each of said capacitors.

3. Apparatus for measuring the electrical characteristics of a circuit element comprising a standard element of known characteristics connected in parallel to said circuit element, a separate tuning means in series with each of said elements for resonating therewith, said tuning means being ganged to closely track each other throughout their tuning range, a variable voltage source of adjustable frequency, means coupling a selected voltage of predetermined frequency from said source to each series resonant circuit, means for measuring and separately displaying the amplitude of the voltage drop across each of said tuning means, said last named means being calibrated directly in values of Q, and means for achieving an initially balanced condition in said measuring means prior to the coupling of said selected voltage to each series resonant circuit.

4. An apparatus for determining the Q and resonant frequency characteristics of a circuit element relative to a standard comprising a variable voltage source of adjustable frequency, means coupling a signal of selected voltage and frequency from said source in parallel to said circuit element and said standard, a separate tuning means in series with said circuit element and said standard for resonating therewith, said tuning means being ganged to closely track each other throughout their tuning range, and means for simultaneously and separately measuring the voltage drop across each of said tuning means, said last-named means being calibrated directly in values of Q.

5. An apparatus for determining the Q and resonant frequency characteristics of an unknown inductance relative to a standard inductance comprising two pairs of terminals, each of said pairs being adapted to receive one of said inductances, a separate adjustable tuning capacitor connected respectively to one terminal of each of said pairs of terminals, said tuning capacitors being ganged to closely track each other throughout their tuning range, a variable voltage source of adjustable frequency, means coupling a signal of selected voltage and frequency from said source across each capacitor and the other terminals of said pairs of terminals, and means for simultaneously and separately displaying the amplitude of the voltage drop across each of said tuning capacitors, said last-named means being calibrated directly in values of Q.

6. An apparatus for simultaneously and directly measuring and comparing the Q and resonant frequency characteristics of an unknown inductance relative to a standard inductance comprising two pairs of terminals, each of said pairs being adapted to receive one of said inductances, a separate adjustable tuning capacitor connected respectively to one terminal of each of said pairs of terminals, said tuning capacitors being ganged to closely track each other throughout their tuning range, a non-reactive resistor electrically connected at one end to the other terminals of said pairs of terminals and at the other end to each of said tuning capacitors, said resistor having a resistance which is negligible in comparison to the resistance of either of said inductances, means for establishing a signal across said resistor of predetermined voltage and frequency, and means for simultaneously and separately displaying the amplitude of the voltage drop across each of said tuning capacitors, said last-named means being calibrated directly in values of Q.

References Cited in the file of this patent

UNITED STATES PATENTS

| | | |
|---|---|---|
| 1,601,070 | Horton | Sept. 28, 1926 |
| 2,137,787 | Snow | Nov. 22, 1938 |
| 2,376,394 | Sinclair | May 22, 1945 |
| 2,377,275 | Smith | May 29, 1945 |
| 2,457,727 | Rifenbergh | Dec. 28, 1948 |
| 2,558,190 | Miller | June 26, 1951 |
| 2,639,411 | Schafer | May 19, 1953 |
| 2,654,066 | Rosenbaum | Sept. 29, 1953 |
| 2,779,917 | De Bois Blanc | Jan. 29, 1957 |